United States Patent
Hermstein

[11] 3,746,424
[45] July 17, 1973

[54] WEATHER-RESISTANT LIGHT TRANSMITTING ISOLATING DEVICE

[75] Inventor: Wolfgang Hermstein, Berlin, Germany

[73] Assignee: Siemens Aktiengesellschaft, Berlin and Munich, Germany

[22] Filed: July 2, 1971

[21] Appl. No.: 159,279

[30] Foreign Application Priority Data
July 8, 1970  Germany.............. P 20 34 884.9

[52] U.S. Cl. .................. 350/96 B, 174/80
[51] Int. Cl. ............................. G02b 5/16
[58] Field of Search ............... 350/96 B; 174/80

[56] References Cited
UNITED STATES PATENTS

| | | | |
|---|---|---|---|
| 3,285,242 | 11/1966 | Wallace | 350/96 B X |
| 3,363,174 | 1/1968 | Hudson et al. | 350/96 B UX |
| 3,377,420 | 4/1968 | Brown et al. | 174/80 X |
| 3,625,686 | 12/1971 | Kitano | 350/175 GN UX |
| 3,331,956 | 7/1967 | Hough et al. | 350/96 B UX |

Primary Examiner—John K. Corbin
Attorney—Curt M. Avery, Herbert L. Lerner, et al.

[57] ABSTRACT

A weather resistant isolating device for transmitting light through a high-voltage field has a trunk of fiber material and at least one glass-fiber bundle suitable for transmitting light contained in the trunk. The trunk and bundle are flexible and a jacket of synthetic material surrounds the trunk and has a plurality of skirts distributed along its length.

5 Claims, 3 Drawing Figures

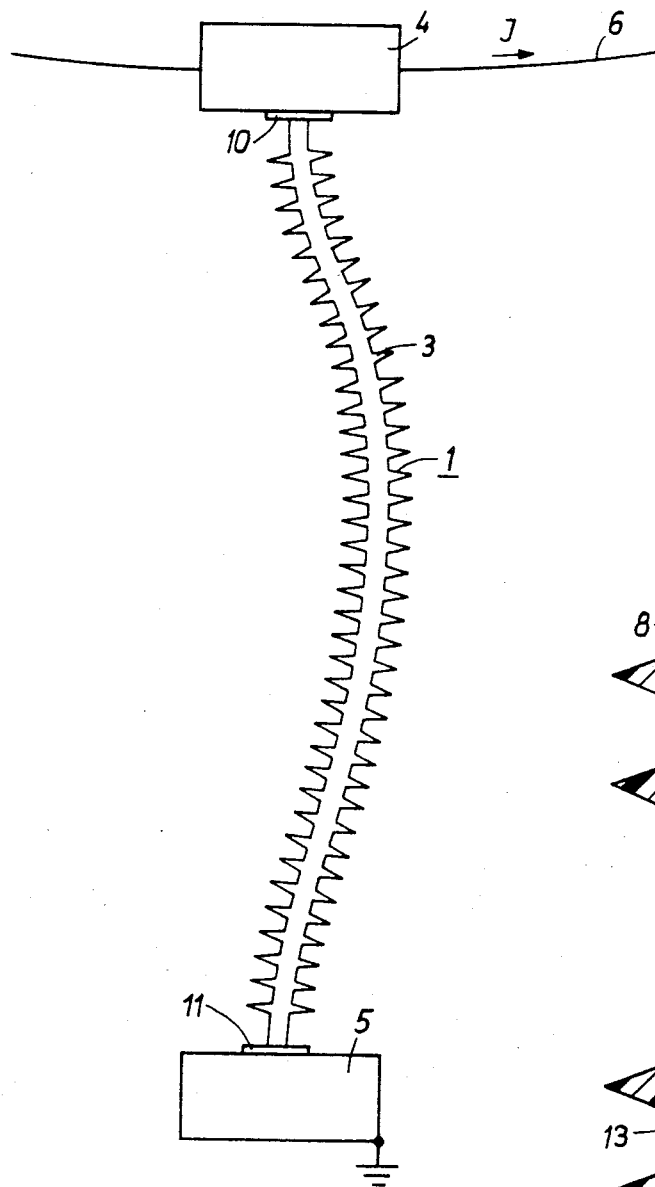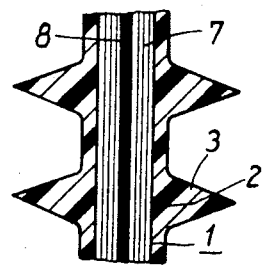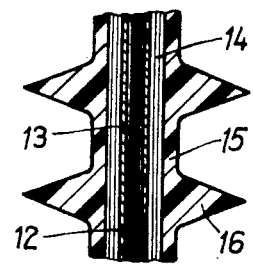

WEATHER-RESISTANT LIGHT TRANSMITTING ISOLATING DEVICE

My invention relates to a weather resistant isolation device for transmitting light through an electric high voltage field.

In known apparatus for optically transmitting visual indications through an electric high-voltage field, a tubular high-voltage isolation member is used posessing a hollow space sealed unilaterally at one end so as to be gas and liquid tight. The member is so arranged that one closure cap of the tubular isolating member is located in the plane of the high-voltage potential and the other closure end cap lies at the ground potential. Light channels for directing light rays serving as information carriers are provided at the inner region of the isolating member, the light channels being passed through the end closure caps. The light channels consist of tubes running parallel to one another and made of light passing material. The light channels can, however, be known light conductors comprising special glass fiber bundles.

The disadvantage of known arrangements for optically transmitting light of visual indications through an electric high voltage field is above all its very high cost. So, for such an arrangement, except for the light conducting tubes or light conductors, there is a tubular high-voltage isolating member with closure end caps provided which not only must provide on the outside the required creep current path by using skirts but must also have its interior region filled with gas or insulating oil.

Accordingly, it is an object of my invention to provide isolating device for transmitting light through a high-voltage electric field which precludes the aforementioned disadvantages. Subsidiary to this object it is an object of my invention to provide an isolating apparatus which is resistant to ambient air and weather conditions.

It is another object of my invention to provide an isolating device of the aforementioned type that is flexible and therefore relatively insensitive to mechanical disturbances.

According to a feature of the isolating device of the invention, a trunk comprised of fiber material with at least one glass-fiber bundle contained therein suitable for transmitting light is provided which stretches from one end of the isolating device to the other end thereof. In addition, a jacket of synthetic material surrounds the trunk possesses skirts. The jacket and therewith the total isolating device is preferably flexible so that the danger of a break or other damage as a consequence of mechanical disturbances is precluded. The synthetic material jacket preferably resists moisture and is substantially resistant to creep currents. The jacket can for example consist of silicone rubber. As a fiber material for the trunk which guarantees the mechanical stability of the isolating apparatus, long glass fibers, nylon bands or laces or similar material can be used.

An electrical insulator is already known which consists of a trunk having a synthetic material jacket as well as stacked skirts wherein the trunk is made of glass fibers which are mutually joined by synthetic resin. However, this insulator possesses no suitable glass-fiber bundle for light transmission. It is therefore not suitable as an isolation device for light transmission through a high-voltage field that is resistant to air and weather conditions.

Correspondingly, in this connection it can be mentioned that a further known high-voltage insulator comprises a hose-like member made of fiber or matting material is provided over the entire length of the insulator and is coated inside and outside with a casting resin. The hose-like member is extended at several locations for forming skirts and/or ribs.

In order to obtain an insulating apparatus resistant to weather and air conditions for transmitting light through a high-voltage field it is not sufficient to use glass-fiber bundles suitable for transmitting light. Indeed, these glass-fiber bundles are practically electrically non-conductive, however, they do not guarantee a reliable isolation because layers of foreign material build up because of rain, fog and contaminants.

Therefore it has already been suggested to arrange light conducting glass-fiber bundles in protective porcelain insulators. This, however, incurs a relatively high cost and there is the possibility of the danger of mechanical damage which can occur because of line movements and high wind velocities.

In an isolating device according to the invention, a glass-fiber bundle can be arranged in a somewhat arbitrary manner in the isolating device proper. It is advantageous, for example, if the glass-fiber bundle suitable for light transmission is tightly embedded along the isolating distance. Thus, during production of the synthetic material jacket, the glass fiber bundles can be simultaneously enclosed with the remaining portions of the trunk by the encapsulating material.

According to another feature of the invention it is advantageous if at least one isolating hose is tightly embedded into which the glass-fiber bundles suitable for transmitting the light are guided. With respect to the number of glass-fiber bundles required, there is the possibility to accommodate the situation at a given time in a simple manner in that only so many flass-fiber bundles are inserted subsequently into the isolating hose-like member as are required for the light transmission at the time. In this way, there is a savings realized in the relative high cost of glass-fiber bundles.

According to still another feature of the invention, it is preferable if the glass-fiber bundle for light transmission is an index-gradient light conductor. Such a light conductor has the characteristic that its refraction index becomes continually smaller proceeding from the center to the edge of the light conductor. A light conductor of this type not only possesses smaller light losses than the conventional light conductor, it also is advantageous in that it transmits polarized light without error. Conventional light conductors do not have such characteristics. Index-gradient light conductors of the type which can be used with the instant invention are described in the journal: Japan Electronic Engineering, February 1969, pages 22 to 25.

It is advantageous if the ends of the isolating device are provided with flanges for connecting the same or for joining several such devices with each other. This affords the possibility of having a relatively long isolating device assembled expeditously from finished portions.

The invention will now be described with reference to the drawing, wherein:

FIG. 1 illustrates an isolating device of the invention disposed in a high-voltage field;

FIG. 2 illustrates a portion of the device of FIG. 1 in longitudinal section showing embedded glass-fiber bundles; and FIG. 3 illustrates a portion of the device of FIG. 1 in longitudinal section wherein an insulating hose is provided to accommodate the glass-fiber bundles.

The isolating device 1 is surrounded with a jacket 2 of synthetic material for extending the creep path and for preventing the corrosive action of the atmosphere and the creep currents. The jacket 2 extends out to form skirts 3 at a plurality of locations. Jacket 2 is flexible so that the danger of a breaking or other damage as a consequence of mechanical movement is prevented. The jacket 2 consists preferably of a moisture rejecting material which is also substantially resistant to creep currents. Such material can be, for example, silicone rubber.

FIG. 1 illustrates the isolating device according to the invention as arranged between a measuring apparatus 4 at the high-voltage potential and an apparatus 5 for detecting measured values arranged at the low voltage potential. The measuring apparatus 4 on the high-voltage potential detects a current J in a high voltage conductor 6 and modulates light corresponding to the instantaneous value of the current J. The light to be modulated can be generated in the measuring apparatus 4 or can be transmitted from a light source located in the detection apparatus 5 at the low-voltage side via a suitable glass-fiber bundle to the high-voltage side measuring apparatus 4. By means of a further glass-fiber bundle suitable for light transmission and disposed in the isolating device 1, modulated light can in this instance be transmitted from the measuring apparatus 4 to the detection device 5. As a cost saving measure, it is preferable also with light sources located at the low voltage side, to use only a single glass-fiber bundle and to direct over the latter the unmodulated light from the low-voltage side to the high-voltage side and to direct the modulated light in the opposite direction.

To illustrate in greater detail the inner construction of the isolating device according to the invention reference may be had to FIG. 2 which illustrates a longitudinal section through a portion of the device of FIG. 1. In addition to the synthetic material jacket 2 with its ribs or skirts 3, there is a trunk 7 extending in the longitudinal direction of the isolating device 1. The trunk 7 contains glass fibers, nylon bands or nylon lacing or other fiber material. This is at least one glass-fiber bundle 8 suitable for light transmission contained in the trunk 7. This glass-fiber bundle 8 and the fiber materials forming the trunk 7 are embedded together in the jacket 2 of synthetic material.

With the invention, a weather resistant isolating device for transmitting light through an electric high-voltage field is obtained which, in comparison to known devices of this art, is not only considerably simpler and therewith less costly to produce, but is also distinguished through a considerably higher operational reliability since it functions without gas or isolating fluid. The isolating device according to the invention is also with respect to its constructional dimensions considerably more expeditious than the known isolating devices and can be coiled and rolled up for transport much the same as a conductor or cable. The isolating device according to the invention is therefore in many respects superior to known arrangements for optically transmitting visual indications through a high-voltage field.

FIG. 3 shows a glass-fiber bundle 12 disposed in an insulating tube or hose 13, the latter being tightly embedded in the isolating device. The insulating hose 13 is surrounded by the fibrous material of the trunk 14 which is in turn included in the jacket 15 of synthetic material having skirts 16.

While the invention has been described by means of specific examples and in specific embodiments, I do not wish to be limited thereto, for obvious modifications will occur to those skilled in the art, without departing from the essential features of the invention and within the scope of the claims annexed hereto.

I claim:

1. A weather resistant isolating device for transmitting light through a high-voltage field, comprising a trunk of fiber material, at least one glass-fiber bundle suitable for transmitting light contained in said trunk, said trunk and said bundle being flexible, and a flexible jacket of synthetic material surrounding said trunk and having a plurality of skirts distributed along its length, whereby said isolating device is rendered flexible.

2. A device according to claim 1, said glass fiber bundle being tightly embedded in said trunk.

3. A device according to claim 1, comprising an isolating tube embedded in said trunk, said glass-fiber bundle being disposed in said tube.

4. A device according to claim 1, said glass-fiber bundle being an index-gradient light conductor.

5. A device according to claim 1, said device having respective coupling flanges at its ends.

* * * * *

PO-1050
(5/69)

UNITED STATES PATENT OFFICE
CERTIFICATE OF CORRECTION

Patent No. 3,746,424　　　　　　　　Dated July 17, 1973

Inventor(s) WOLFGANG HERMSTEIN

It is certified that error appears in the above-identified patent and that said Letters Patent are hereby corrected as shown below:

In the heading to the printed specification, Line 10, after P 20 34 884.9 add -- -51 --.

Signed and sealed this 19th day of February 1974.

(SEAL)
Attest:

EDWARD M. FLETCHER, JR.
Attesting Officer

C. MARSHALL DANN
Commissioner of Patents